July 28, 1953   J. H. COULLIETTE   2,647,017
NOZZLE
Filed April 19, 1951

*James H. Coulliette*

INVENTOR

Patented July 28, 1953

2,647,017

UNITED STATES PATENT OFFICE 2,647,017

NOZZLE

James H. Coulliette, Chattanooga, Tenn., assignor to Industrial Research Institute of the University of Chattanooga, Chattanooga, Tenn.

Application April 19, 1951, Serial No. 221,757

4 Claims. (Cl. 299—144)

This invention relates to fluid control devices and particularly to a spray nozzle.

In humidifiers and other similar devices it is often desirable to control the nozzle from a distance, or to provide automatic control. Magnetic or motor driven valves have been used for regulating fluid flow, as well as other complicated mechanisms.

It is an object, therefore, to provide a humidifier or other nozzle for controlling spray of a fluid, with simple and relatively inexpensive construction.

Another object is to provide a humidifier or similar nozzle which is responsive to temperature change.

A further object is to provide a nozzle which can be regulated by application of heat.

An additional object is to provide a heated nozzle for regulating viscosity of a fluid passing therethrough.

Other objects will appear in the following description.

Figure 1:
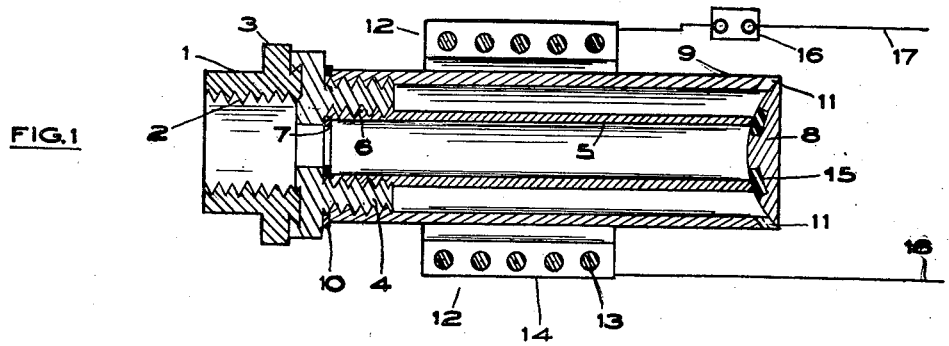
Figure 1 is a sectional elevation of a nozzle and heating element, and showing a connected humidistat.

Figure 1 shows a sectional elevation of a nozzle and heating coil, showing features of my invention. Brass or other metal coupling 1 has internal threads 2 and integral hexagonal shoulder 3 which may be gripped by a wrench for screwing coupling 1 on a threaded pipe supplying water or other fluid. Coupling 1 is attached, by molding or otherwise, to annular sleeve 4 of ceramic or other heat insulation material threaded internally and externally as shown. Tube or pipe 5, having external threads 6 at one end, is screwed into the internal threads of sleeve 4, providing a leak-proof fit. A suitable packing washer 7 may be used if desired. Tube 5 may be of iron, brass, stainless steel, or of other suitable metal but preferably is made of material having a relatively low coefficient of expansion. Glass or other similar material could be used and heat insulation material may be packed in the space between the conduit and the casing.

The other end of tube 5 is shaped to fit snugly against internal dome 8 comprising an end portion of cylinder 9 the other end of which is threaded internally and is screwed tightly onto the outer threaded portion of sleeve 4. Packing washer 10 may be provided to prevent leakage. Cylinder 9 is made of aluminum or other metal having a high coefficient of expansion and has a plurality of small holes or narrow slots 11 around the periphery and aligned to direct spray in the desired manner. As shown, these openings are aligned substantially parallel with the contour of dome 8 at its edge. Obviously openings or ports could be provided in element 8 and can be directed parallel with the axis of the coaxial tube 5 and cylinder 9, or at any desired angle or angles.

Annular heating element 12 is suitably attached around cylinder 9 and comprises Nichrome or other electrical resistance wire 13 embedded in ceramic or other insulating heat resistant material 14 which may be porcelain, magnesium oxide or the like, molded, bonded, or compressed into a unitary structure. While attached sleeve 4 is shown, this sleeve could be of metal, integral with coupling 1.

In operation, coupling 1 is screwed onto a suitable fluid supply pipe, not shown, and the terminals of resistance heating element 13 are connected, to a suitable source of electric current. The heat produced in element 12 will then cause heating of cylinder 9 which expands, thereby moving dome 8 away from the normally closely fitting end of tube 5 so that water or other fluid in tube 5 will flow rapidly through the gap between the tube and dome, and through openings 11, forming a spray. When it is desired to stop the flow of fluid the electrical circuit including wire 13 is opened so that the heating unit 12 and cylinder 9 are cooled. This results in contraction of the cylinder 9 which causes dome 8 to be pulled tightly against the end of tube 5, and accordingly stops flow of the water or other fluid. If desired, band 15 of synthetic rubber, silicone plastic, lead, or other soft material can be attached to or imbedded in dome 8 to provide a leak-proof seal. The sealing pressure at predetermined temperature can be adjusted by screwing tube 5 into or out of threaded sleeve 4. Element 15 if of rubber or the like will also provide heat insulation between tube 5 and dome 8.

This nozzle has a temperature-responsive feature, which can be used to advantage in humidifiers and similar devices. If humidistat 16, having an electrical switch, is connected in series with electrical supply lines 17—18 and element 13, then the humidistat switch will be closed, thereby supplying current to the heating wire 13 when the humidity is low. Accordingly, expansion of cylinder 9 will occur and the nozzle will spray water until the humidity is brought up to the desired value. When this occurs the humidistat opens its switch and current is cut off from the heating element.

This nozzle can also be used as an automatic temperature control without element 12. In that case, cylinder 9 expands and allows a water spray to escape from openings 11, as described when the temperature rises above a predetermined value. The spray cools the air or other medium adjacent the nozzle and the cylinder therefore contracts and stops the flow of water at predetermined lower temperature. Adjustment for temperature may be effected by turning tube 5 so it is moved relative to dome 8, or similarly, cylinder 9 may be moved axially by rotating it around the outer threads on sleeve 4.

Another advantage of the invention is that it may be used to spray certain substances like waxes which are normally solid. The heat from element 12 can be sufficient to melt the wax or other solid or it may be effective in reducing the viscosity of a naturally viscous medium like paint, lacquer, or other substances. This device may also be used for spraying insecticides. It has the advantage that the flow may be controlled electrically at the nozzle so that excessive drainage does not occur when the flow is stopped. This simple type of distance control makes the device likewise very useful in many industrial applications.

It will be noted that the fluid is atomized twice, once when passing through the gap between tube 5 and element 15 and again when passing through openings 11. This double action tends to produce a fine spray.

This nozzle is also useful in sprinkler systems for extinguishing fires. A plurality of the nozzles may be screwed into a water supply pipe or pipes at strategic locations over a building or other object to be protected. If a fire occurs near a nozzle or if it becomes overheated from any cause, the outside cylinder will expand so that a spray of water will be discharged. This spray will continue as long as the nozzle is heated beyond the pre-set closing temperature. After the fire is extinguished the nozzle will become relatively cool and therefore will automatically stop the discharge of water. This automatic closing feature is very desirable since prior sprinkler heads or nozzles have allowed copious discharge of water even though a fire may have been extinguished.

Figure 2:
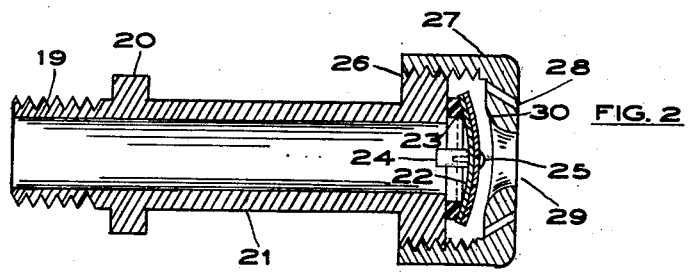
Figure 2 is a part sectional elevation of a nozzle having a snap-action bimetal valve element.

In Figure 2, threaded coupling 19 has shoulder 20 which may have an hexagonal perimeter. Tube 21 is integral with shoulder 20 and has a smooth end shaped so that bimetal disc 22, when cooler than a predetermined temperature, will press tightly against the edge of tube 21 to seal the junction against leakage of water or other fluid which may be supplied to the tube from a pipe or tank to which coupling 19 may be connected. The edge of tube 21 may comprise ring 23 of soft material like lead, silicone plastic, or the like, in order to provide good sealing action. The ring can be attached by cement, screws, or by bonding otherwise. Lug 24 extends radially inward from tube 21 and has an axially aligned threaded hole therein. Screw 25 is passed through a central hole in bimetal disc 22 and is screwed into the hole in the lug in order to clamp the disc in the position shown, sealing the end of tube 21 against flow of fluid therefrom.

Raised, threaded ring 26 may be integral with tube 21 and threaded cap 27 is screwed onto ring 26. This cap has small holes 28 directed generally toward the axis or in any desired direction. If desired, central opening 29 may also be provided in the cap and the inclined portion 30 will act as a stop for disc 22 when it snaps outward. The portion 30 can act as a seal to prevent flow of fluid through opening 29, if this is desired. The opening 29 serves a useful purpose in that it allows a heated medium like air or flame to come directly into contact with the heat responsive bimetal disc. The effective area of discharge for the fluid can be regulated by screwing the cap on ring 26 to different positions. If stop element 30 is brought nearer to the disc the discharge opening will be less. While the bimetal disc is shown as sealing against pressure, it may be placed inside an internally flanged tube so that the fluid pressure will help to press the disc against the flange to seal against fluid flow. Sufficient temperature rise will then cause the disc to snap inward and so to open a discharge gap, the tube being of larger internal diameter than the diameter of the disc.

In operation, assuming that the device is connected to a water supply system, for instance, the water will be prevented from flowing until the temperature rises to a pre-set value at which time bimetal disc 22 will snap outward until it strikes stop 30.

Water will then be forced out of the gap between the element 23 and the disc. When the temperature of the disc cools sufficiently the bimetal disc will snap back to closing position and so will stop the flow of water. This device is useful as an automatic sprinkler head for extinguishing fires and then stopping water flow after the fire is quenched.

Figure 3:
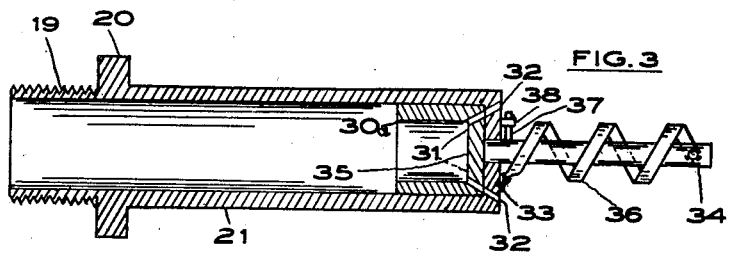
Figure 3 is a part sectional elevation of a nozzle having a rotary valve and helical bimetal control element.

In Figure 3, like parts are given similar numerals as in Figure 2. In this modification of the invention cylindrical cup-like valve 30a is rotatable in tube 21, a close fit being provided to prevent leakage. A plurality of holes or channels 31 in the end piece 35 of element 30a are arranged so that they normally are out of register with channels 32 in end piece 33 of tube 21. In the position shown, therefore, the valve is closed and no water or other fluid will flow therethrough. Round rod or shaft 34 is attached coaxially to the end piece 35 and extends through a hole in end piece 33 so that valve 30a may be rotated by means of the attached rod. Helical bimetal element 36 surrounds rod 34 and has one end attached to end piece 33, the other end being attached to the extended end of rod 34.

In operation, bimetal element 36 normally holds valve 30a in closed position but if this element is heated above a predetermined temperature it will twist through an angle sufficient to bring channels 31 into register with channels 32 and so water in pipe 21 under pressure will rush through the latter channels forming a spray. Upon cooling, element 36 will again close the valve. Advantages of this construction are that the valve can be turned freely even under heavy fluid pressure, and bimetal element 36, due to its relatively large area and number of turns, can be made quite sensitive. Pin 37 extending from rod 34 will strike pin 38 extending from end piece 33 so that the rotation of valve 30a will be stopped when channels 31 and 32 are in alignment. Another pin attached to end piece 33 can be used to limit reverse rotation of the valve, for lower temperatures.

Figure 4:
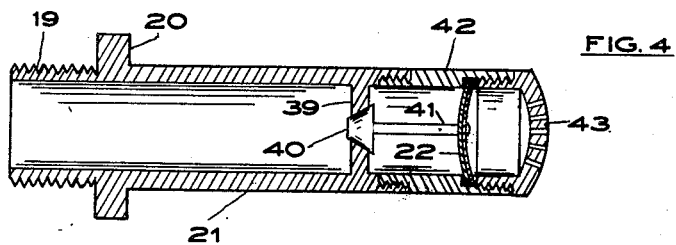
Figure 4 is a part sectional elevation of a nozzle having a heat insulated snap-action bimetal control element for a valve.

In Figure 4, tube 21 has internal valve seat 39 against which valve 40 is pressed by attached stem 41 which may be of ceramics, plastics, or other material of poor heat conductivity. End tube 42 may likewise be of plastic like teflon or it may be of ceramic material. Snap-action bimetal disc 22 is seated in the end of tube 42 which may be screwed onto tube 21 as indicated. This disc is held in place by perforated threaded cap 43 which forms a spray when valve 40 is snapped to the right by stem 41 which is fastened centrally to disc 22. The heat insulation material prevents the temperature of the fluid in tube 21 from influencing appreciably the operation of bimetal element 22. This element snaps to the left when cool, to force valve 40 against seat 39 with sufficient pressure to prevent leakage and it snaps to the right to open the valve when the temperature of element 22 rises above a predetermined value.

The nozzles or spray heads shown in Figures 3 and 4 may be used in sprinkler systems for extinguishing fires, or for many other purposes.

Numerous modifications and changes of detail can be made without departing from the general principles of my invention.

What I claim is:

1. In a nozzle, means including material of relatively poor heat conductivity for connecting with a source of fluid, an inner conduit for said fluid attached to said material, an outer casing member attached to said material and surrounding said inner conduit and spaced therefrom, a portion of said casing member acting as a valve to seal said conduit against fluid flow therethrough when said outer casing member contracts sufficiently with change of temperature, said casing member having an opening therein for discharge of said fluid.

2. The device of claim 1, and means for heating said casing member.

3. The device of claim 1, said valve including material of poor heat conductivity in contact with said inner conduit.

4. The device of claim 1, said inner conduit being of material of relatively poor heat conductivity.

JAMES H. COULLIETTE.

References Cited in the file of this patent

UNITED STATES PATENTS

| Number | Name | Date |
|---|---|---|
| 87,181 | Massey | Feb. 23, 1869 |
| 208,962 | Crosby | Oct. 15, 1878 |
| 306,352 | Prentiss | Oct. 7, 1884 |
| 735,756 | Grimsley | Aug. 11, 1903 |
| 1,697,432 | Martin | Jan. 1, 1929 |
| 2,083,780 | Gille | June 15, 1937 |
| 2,136,460 | Peteler | Nov. 15, 1938 |
| 2,241,086 | Gould | May 6, 1941 |
| 2,285,305 | Reid | June 2, 1942 |
| 2,462,198 | Johnson | Feb. 22, 1949 |

FOREIGN PATENTS

| Number | Country | Date |
|---|---|---|
| 325,302 | France | Apr. 25, 1903 |
| 219,021 | Great Britain | Apr. 9, 1925 |